United States Patent
Hesse

(10) Patent No.: US 7,506,077 B2
(45) Date of Patent: Mar. 17, 2009

(54) UNIFIED CONTROLLER HAVING HOST AND DEVICE FUNCTIONALITY

(75) Inventor: Kay Hesse, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 462 days.

(21) Appl. No.: 11/158,512

(22) Filed: Jun. 22, 2005

(65) Prior Publication Data

US 2006/0195625 A1 Aug. 31, 2006

(30) Foreign Application Priority Data

Feb. 28, 2005 (DE) ............. 10 2005 009 021

(51) Int. Cl.
*G06F 3/00* (2006.01)
*G06F 13/20* (2006.01)
(52) U.S. Cl. .......................... 710/8; 710/313
(58) Field of Classification Search ............ 710/8, 710/313
See application file for complete search history.

(56) References Cited

U.S. PATENT DOCUMENTS

| | | | |
|---|---|---|---|
| 5,951,667 A * | 9/1999 | Abramson | 710/309 |
| 6,732,218 B2 | 5/2004 | Overtoom et al. | |
| 2003/0043851 A1 * | 3/2003 | Wu et al. | 370/476 |
| 2003/0101298 A1 * | 5/2003 | Chang et al. | 710/107 |
| 2004/0019732 A1 * | 1/2004 | Overtoom et al. | 710/313 |
| 2006/0095642 A1 * | 5/2006 | Hesse et al. | 710/313 |

FOREIGN PATENT DOCUMENTS

WO  WO 2004/029817  4/2004

OTHER PUBLICATIONS

Translation of Communication from German Patent Office, Nov. 14, 2005.

* cited by examiner

*Primary Examiner*—Henry W. H. Tsai
*Assistant Examiner*—Hyun Nam
(74) *Attorney, Agent, or Firm*—Meyertons Hood Kivlin Kowert & Goetzel, P.C.

(57) ABSTRACT

A USB (Universal Serial Bus) OTG (On-The-Go) controller device and more generally a serial bus control circuit chip are provided which have improved port handler implementations. In one example, different port handler units may be provided which selectively support host and device functionality at the respective ports. In another example, a first port handler for providing host functionality and a second port handler for providing device functionality are provided which are of substantially the same hardware structure. In a further example, at least one port handler is provided that has a low level protocol module for handling packet assembly and/or disassembly, a transfer buffer module for buffering incoming or outgoing data to average out system memory latencies, and a memory access module for generating memory requests in compliance with host and/or device functionality.

42 Claims, 4 Drawing Sheets

UNIFIED CONTROLLER HAVING HOST AND DEVICE FUNCTIONALITY

BACKGROUND OF THE INVENTION

1. Field of the Invention

The invention generally relates to USB (Universal Serial Bus) OTG (On-The-Go) controller devices and more generally to integrated circuit chips having circuitry for controlling data transfer to and/or from at least one peripheral device which selectively has device or host functionality and which is connected to a serial bus.

2. Description of the Related Art

The Universal Serial Bus was originally developed in 1995 to define an external expansion bus which facilitates the connection of additional peripherals to a computer system. The USB technique is implemented by PC (Personal Computer) host controller hardware and software and by peripheral friendly master-slave protocols and achieves robust connections and cable assemblies. USB systems are extendable through multi-port hubs.

In USB systems, the role of the system software is to provide a uniform view of the input/output architecture for all applications software by hiding hardware implementation details. In particular, it manages the dynamic attach and detach of peripherals and communicates with the peripheral to discover its identity. During run time, the host initiates transactions to specific peripherals, and each peripheral accepts its transactions and response accordingly.

Hubs are incorporated to the system to provide additional connectivity for USB peripherals, and to provide managed power to attached devices. The peripherals are slaves that must react to request transactions sent from the host. Such request transactions include requests for detailed information about the device and its configuration.

While these functions and protocols were already implemented in the USB 1.1 specification, this technique was still improved in order to provide a higher performance interface. FIG. 1 illustrates an example USB 2.0 system that comprises a host controller 100, a number of USB devices 115, 120, 125, 130, and two hubs 105, 110. In the system of FIG. 1, the hubs 105, 110 are introduced for increasing connectivity, but in other USB systems, the USB devices can be connected directly to the host controller 100.

As mentioned above, USB 2.0 provides a higher performance interface, and the speed improvement may be up to a factor of 40. Moreover, as apparent from FIG. 1, USB 2.0 is backwards compatible with USB 1.1 because it allows for connecting USB 1.1 devices 120, 125, 130 to be driven by the same host controller 100. There may even be used USB 1.1 hubs 110.

As can be seen from FIG. 1, a USB 1.1 device 120 can be connected directly to a USB 2.0 hub 105. Moreover, it can also be connected directly to the host controller 100. This is made possible by the capability of USB 2.0 host controllers and hubs to negotiate higher as well as lower transmission speeds on a device-by-device basis.

Turning now to FIG. 2, the system software and hardware of a USB 2.0 system is illustrated. The system components can be organized hierarchically by defining several layers as shown in the figure.

In the uppermost layer, the client driver software 200 executes on the host PC and corresponds to a particular USB device 230. The client software is typically part of the operating system or provided with the device.

The USB driver 205 is a system software bus driver that abstracts the details of the particular host controller driver 210, 220 for a particular operating system. The host controller drivers 210, 220 provide a software layer between a specific hardware 215, 225, 230 and the USB driver 205 for providing a driver-hardware interface.

While the layers discussed so far are software implemented, the uppermost hardware component layer includes the host controllers 215, 225. These controllers are connected to the USB device 230 that performs the end user function.

As apparent from the figure, there is one host controller 225 which is an enhanced host controller (EHC) for the high speed USB 2.0 functionality. This host controller operates in compliance with the EHCI (Enhanced Host Controller Interface) specification for USB 2.0. On the software side, host controller 225 has a specific host controller driver (EHCD) 220 associated.

Further, there are host controllers 215 for full and low speed operations. The UHCI (Universal Host Controller Interface) or OHCI (Open Host Controller Interface) are the two industry standards applied in the universal or open host controllers (UHC/OHC) 215 for providing USB 1.1 host controller interfaces. The host controllers 215 have assigned universal/open host controller drivers (UHCD/OHCD) 210 in the lowest software level.

Thus, the USB 2.0 compliant host controller system comprises driver software and host controller hardware which must be compliant to the EHCI specification. While this specification defines the register-level interface and associated memory-resident data structures, it does not define nor describe the hardware architecture required to build a compliant host controller.

Referring now to FIG. 3, the hardware components of a common motherboard layout are depicted. The basic elements found on a motherboard may include the CPU (Central Processing Unit) 300, a northbridge 305, a southbridge 310, and system memory 315. The northbridge 305 is usually a single chip in a core-logic chipset that connects the processor 300 to the system memory 315 and the AGP (Accelerated Graphic Port) and PCI (Peripheral Component Interface) buses. The PCI bus is commonly used in personal computers for providing a data path between the processor and peripheral devices like video cards, sound cards, network interface cards and modems. The AGP bus is a high-speed graphic expansion bus that directly connects the display adapter and system memory 315. AGP operates independently of the PCI bus. It is to be noted that other motherboard layouts exist that have no northbridge in it, or that have a northbridge without AGP or PCI options.

The southbridge 310 is usually the chip in a system core-logic chipset that controls the IDE (Integrated Drive Electronics) or EIDE (Enhanced IDE) bus, the USB bus, that provides plug-n-play support, controls a PCI-ISA (Industry Standard Architecture) bridge, manages the keyboard/mouse controller, provides power management features, and controls other peripherals.

USB functionality is often implemented in a southbridge device or in other companion chips that may be part of a personal computer's chipset. As described above, this functionality provides a popular interface for exchanging data between the computer that has built in the southbridge or companion chip, and peripherals.

In order to allow low-power devices to have limited host capabilities, the "On-The-Go Supplement to the USB 2.0 Specification" has been drafted. The supplement defines two protocols: SRP (Session Request Protocol), which lets a peripheral device ask the host to turn on the USB power, and HNP (Host Negotiation Protocol), which lets a peripheral device become the USB host. Thus, the supplement to the USB 2.0 specification allows a portable device to take on the role of a limited USB host without the burden of supporting all of the USB functions of a personal computer.

Besides others, the OTG supplement specifies dual-role devices that may be operated in full speed (and optionally in high speed) as peripheral, and further in full speed (and optionally in low and high speed) as host. Further, an A-device is specified to be a host at the start of a session. Under certain conditions, the A-device will relinquish the role of host to a dual-role B-device. A B-device is a peripheral at the start of a session. If the device is dual-role, it may be granted the role of host from the A-device.

One way to create a USB 2.0 OTG dual-role device controller has been described in the German patent application number 10 2004 057 756.0 entitled "USB On-The-Go Controller", filed Nov. 30, 2004. A similar arrangement is shown in FIG. 4.

The USB controller device 400 of FIG. 4 has host control units 225, 215, a device control unit 410, a bridge 405, and an OTG controller 415. The host control units form an EHC/UHC/OHC combination and the OTG controller 415 implements OTG functionality to the USB controller device 400. Further, there is a port router 420 for controlling access of the host control units 225, 215 and the device control unit 410 to the shared physical port.

This bundle approach has specific advantages since it may use well-defined, partially even silicon-proven blocks and it allows the use of existing driver software with just some additional OTG controller driver modifications. Further, the arrangement of FIG. 4 may be potentially implemented in a quite short development time.

However, this approach may lead to a non-integrated, non-coherent cluster of designs with different bus interfaces for each part, and may further have a higher degree of redundancy resulting in a considerable size penalty. For instance, the total size of the USB controller device shown in FIG. 4 may be estimated to be in the range of 330 to 390 kgates. Further, as far as the approach of FIG. 4 uses existing designs which have not been optimized for low power consumption, this device may require further circuit development to reduce the power consumption. Moreover, at least the conventional EHCI software interface may create a significant amount of redundant traffic on the system bus, and the bundle approach of FIG. 4 may further lead to long combinational paths in certain situations.

SUMMARY OF THE INVENTION

A USB OTG controller device and a corresponding integrated circuit chip is provided that may have improved density, thus leading to a smaller size, less overhead, and reduced power consumption.

In one embodiment, a USB OTG controller device comprises a first port handler unit which is configured to provide USB OTG functionality at a first port, and a second port handler unit which is configured to provide USB OTG functionality at a second port. Each one of the first and second port handler units is configured to selectively support host and device functionality at the respectively first or second port.

In another embodiment, an integrated circuit chip has circuitry which is adapted to control data transfer to and/or from at least one peripheral device which selectively has device or host functionality and which is connected to a serial bus. The circuitry has a first port handler circuit configured to control data transfer to and/or from a peripheral device which is connected to a first port of the integrated circuit chip. The circuitry further has a second port handler circuit which is configured to control data transfer to and/or from a peripheral device which is connected to a second port of the integrated circuit chip. Each one of the first and second port handler circuits is configured to selectively support host and device functionality at the respective first or second port.

According to a further embodiment, there is provided a USB OTG controller device that comprises a first port handler unit adapted to provide USB host functionality to a first OTG capable device connected to a first port of the USB OTG controller device, and a second port handler unit adapted to provide USB functionality to a second OTG capable device connected to a second port of the USB OTG controller device. The first port handler unit and the second port handler unit are of substantially the same hardware structure.

In still a further embodiment, there is provided an integrated circuit chip that has circuitry that is adapted to control data transfer to and/or from at least one peripheral device which selectively has device or host functionality and which is connected to a serial bus. The circuitry has a first port handler circuit which is adapted to provide host control functionality to a first peripheral device which is connected to a first port of the integrated circuit chip. The circuitry further has a second port handler circuit which is adapted to provide device control functionality to a second peripheral device which is connected to a second port of the integrated circuit chip. The first port handler circuit and the second port handler circuit are of substantially the same hardware structure.

In yet another embodiment, a USB OTG dual-role controller device comprises at least one port handler unit which is configured to provide USB host and/or device functionality at a port to which an OTG capable device is connectable. The at least one port handler unit has a low level protocol module which is adapted to handle packet assembly and/or disassembly, a transfer buffer module which is adapted to buffer incoming or outgoing data to average out system memory latencies, and a memory access module, adapted to generate memory requests in compliance with the USB host and/or device functionality.

According to yet another embodiment there is provided an integrated circuit chip that has circuitry which is adapted to control data transfer to and/or from a peripheral device which selectively has device or host functionality and which is connected to a serial bus. The circuitry comprises at least one port handler circuit which is configured to provide host and/or device control functionality at a port to which the peripheral device is connectable. The at least one port handler circuit has a low level protocol circuit which is adapted to handle packet assembly and/or disassembly, a transfer buffer circuit which is adapted to buffer incoming or outgoing data to average out system memory latencies, and a memory access circuit which is adapted to generate memory requests in compliance with the host and/or device control functionality.

Furthermore, a computer readable storage medium is provided in a further embodiment, storing instructions that, when executed by a processor, cause the processor to drive any of the above controller devices or integrated circuit chips.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
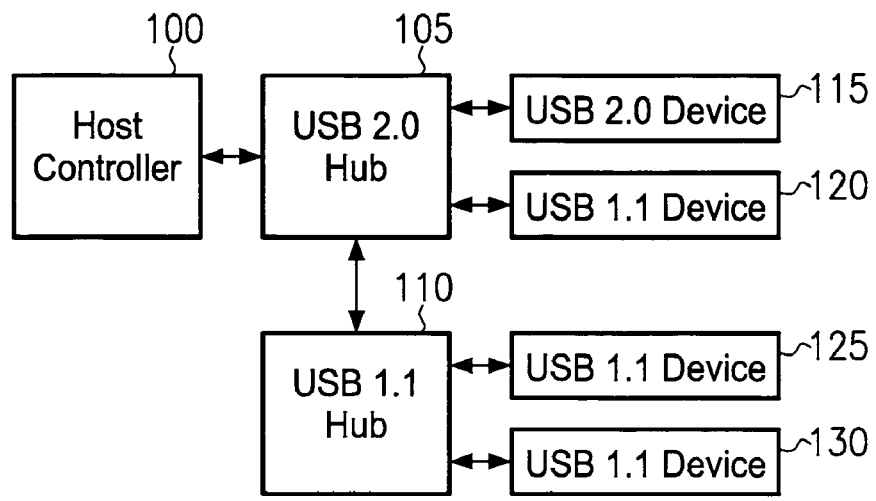
FIG. 1 illustrates an example USB 2.0 compliant system.
Figure 2:
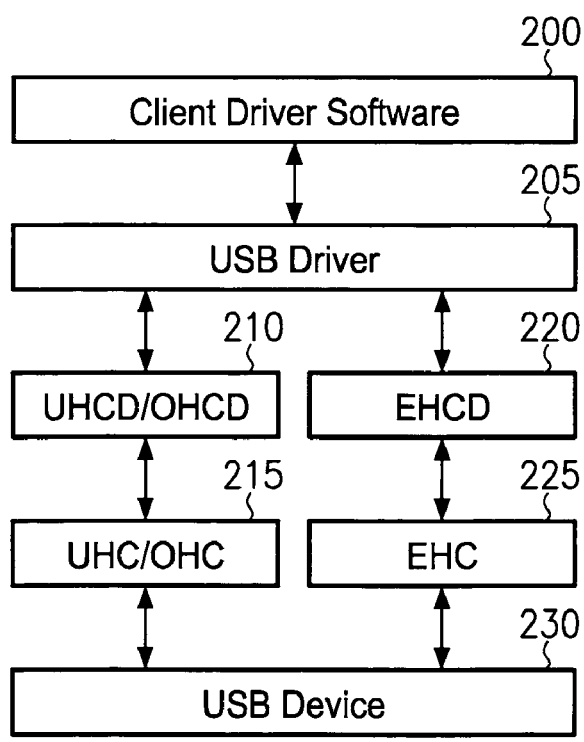
FIG. 2 illustrates the hardware and software component layers in the system of FIG. 1.
Figure 3:
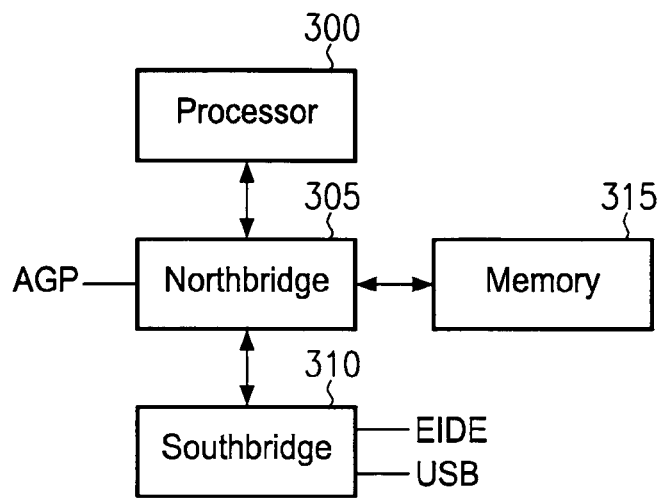
FIG. 3 illustrates a common motherboard layout.
Figure 4:
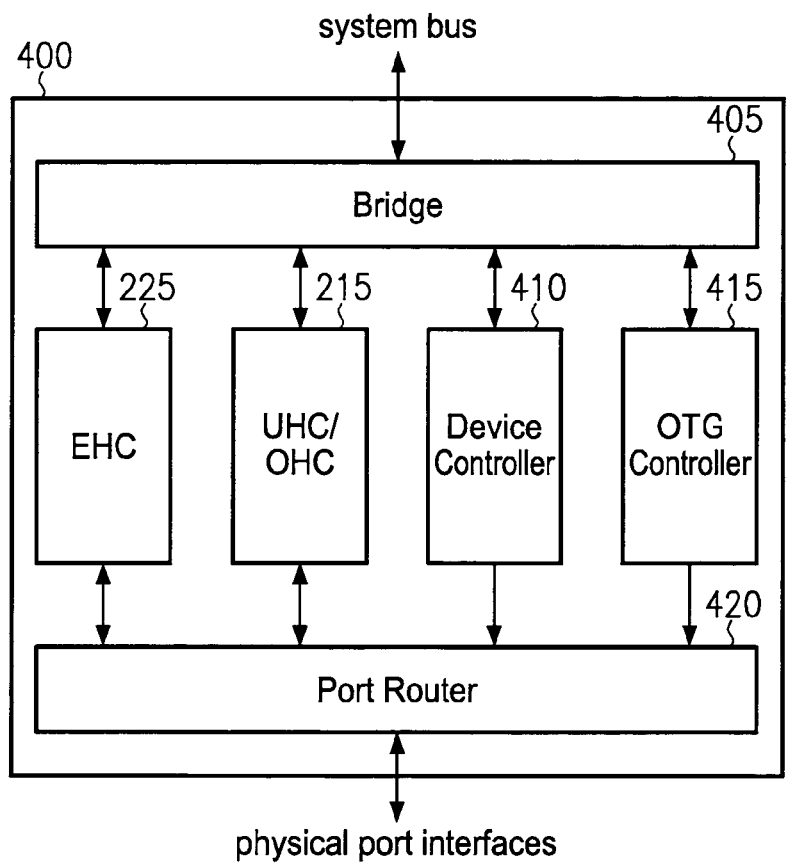
FIG. 4 is a block diagram illustrating the components of a bundle approach USB controller device that has OTG functionality.
Figure 5:
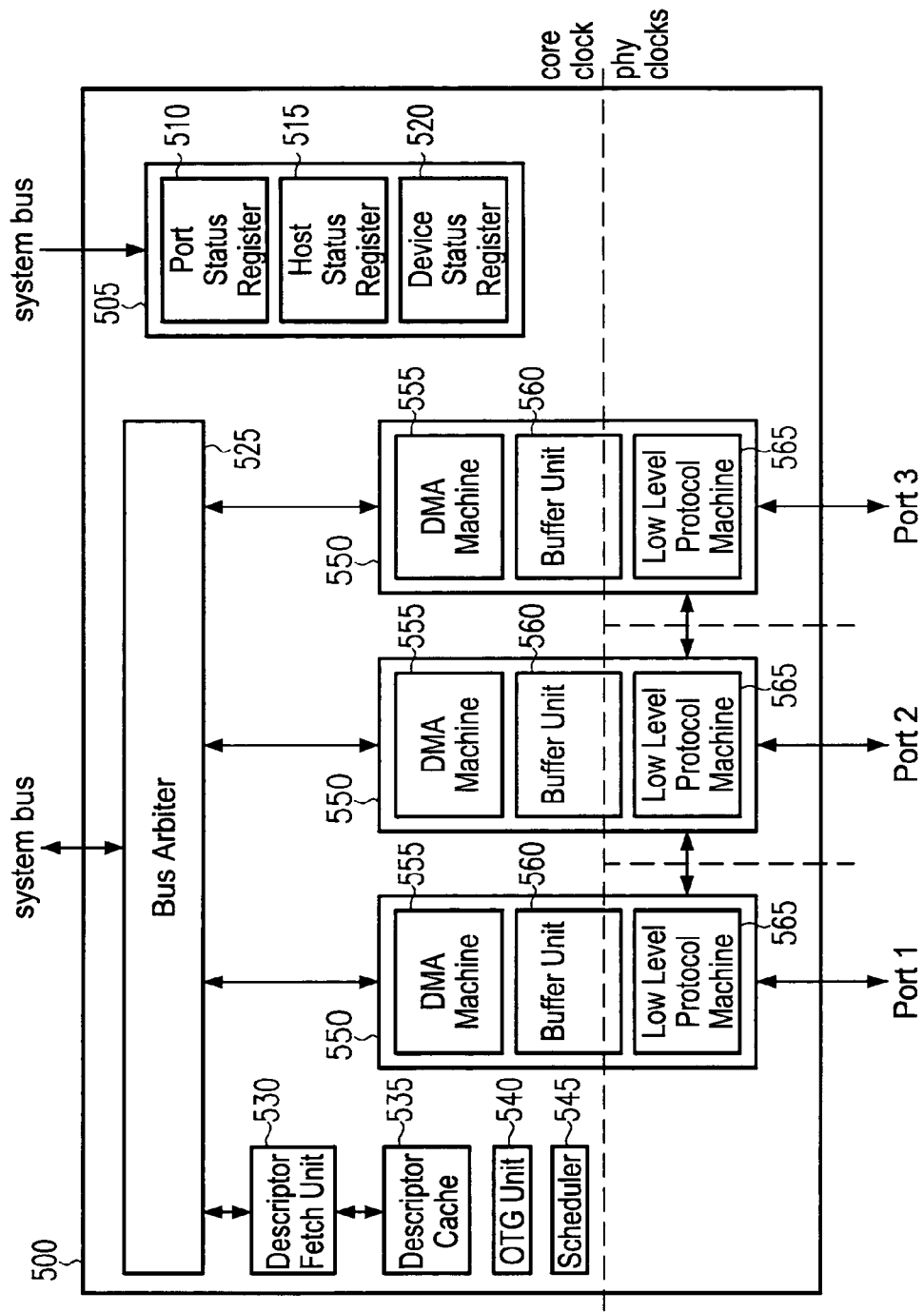
FIG. 5 is a block diagram of a USB OTG controller device according to an embodiment.

Referring now to the drawings and particularly to FIG. 5, which illustrates a USB OTG controller device 500 according to an embodiment, the depicted arrangement has not more than three ports. For each port, there is an individual port handler unit 550 connected to a bus arbiter 525. The bus arbiter 525 arbitrates bus master accesses from internal units to the system bus. The bus arbiter 525 may apply some sort of priority handling.

Further, there is provided a register file 505 having a port status register 510, a host status register 515 and a device status register 520. The register file 505 of the present embodiment is a slave on the system bus and is used to communicate with software, e.g., for storing control data and for providing status information.

A scheduler 545 is provided as central control instance for all host operations, i.e., all port handlers 550 in host mode, regardless of whether the respective port handler operates in high-speed mode or full/low speed mode.

The descriptor fetch unit 530 shown in FIG. 5 may be triggered by the scheduler 545 for fetching and decoding the host traffic descriptors, both for high speed and for full/low speed. The descriptor fetch unit 530 may further assign buffer pointers to the DMA (Direct Memory Access) machines 555 of the port handler units 550.

Further, the USB OTG controller device 500 of FIG. 5 has an optional descriptor cache 535 for host traffic descriptors. The descriptor cache 535 may considerably reduce overhead traffic on the system bus.

Moreover, there is an OTG unit 540 provided which is the controller for the OTG functionality. In the present embodiment, the OTG unit 540 mainly consists of some registers and counters, since the present embodiment handles most of the protocol in software.

Turning now again to the port handler units 550, the present embodiment has one port handler 550 for each port. It is noted that the present embodiment is configured with not more than three ports but other embodiments with higher or lower port numbers exist as well.

Each port handler unit 550 supports all three port modes: the high speed host mode, the full/low speed host mode, and the device mode (for any one of high, full and low speed). In the present embodiment, when more than one port is in the high-speed host mode, one of them becomes the master, i.e., it generates the actual packets, while the other one(s) simply copies this traffic. This is illustrated in FIG. 5 by the horizontal two-way arrows linking the port handlers 550.

In the present embodiment, each port handler unit 550 is of substantially the same hardware structure. In this context, "substantially" means that the overall hardware structure is the same but there may be some minor design differences such as in the size of specific circuits, in clock rates, or the like. The port handlers have three sub-modules 555-565.

The low level protocol machine 565 is a module for handling packet assembly and/or disassembly. Further, the low level protocol machines 565 may provide CRC (Cyclic Redundancy Check) generation and/or checking.

The transfer buffer unit 560 may be a FIFO (First In First Out) structure that is used to average out system memory latencies. Further, the transfer buffer units 560 of the protocol handler units 550 may be used to translate from the core clock to the physical clock domain.

The DMA machines 555 are modules for generating the appropriate memory requests to fetch and/or store the USB data. The DMA machines 555 may be further responsible for enforcing system bus limits, e.g., burst lengths.

It is found that the structure of FIG. 5 may be implemented in a manner that the total block size is in the range of 200-230 kgates, which is considerably, less than what was estimated above for the bundle approach.

When more than three physical ports are supported, the structure of FIG. 5 may still be used. In fact, this would provide maximum flexibility for concurrent operation of any host/device assignments, i.e., each port could become a device, or each port could support its own full/low speed host segment.

Figure 6:
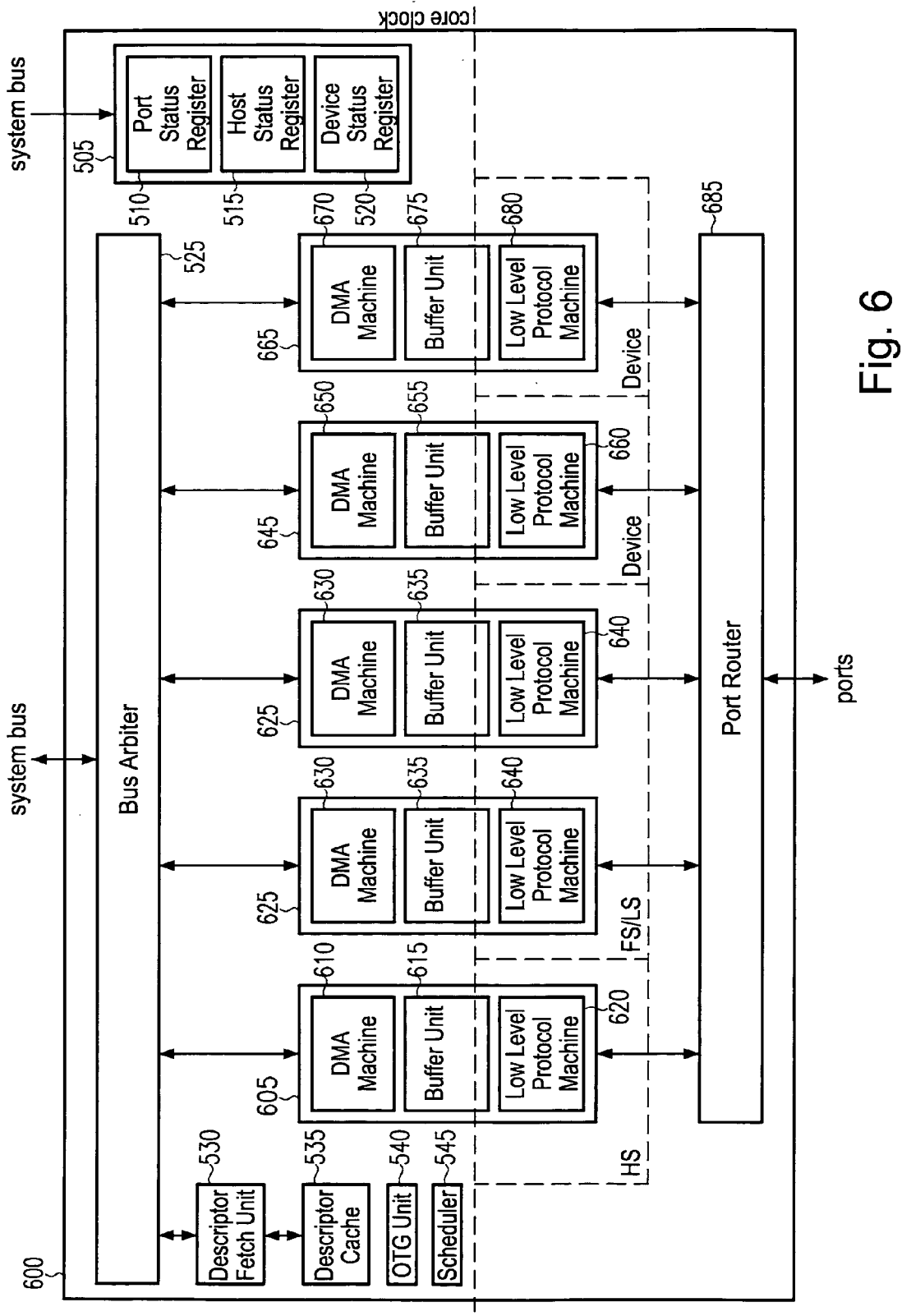
FIG. 6 is a block diagram of a USB OTG controller device according to another embodiment.

In another embodiment, the number of ports that are concurrently in device or full/low speed host mode may be restricted to less than the number of physical ports. An example of such arrangement is shown in FIG. 6. Unlike FIG. 5, the number of physical ports in this approach may be greater than the number of port handler units 605, 625, 645, 665.

Further, the port handler units 605, 625, 645, 665 of the device 600 shown in FIG. 6 are restricted in functionality. For instance, the port handler unit 605 is dedicated to the high speed (HS) host mode, the port handlers 625 are dedicated to the full/low speed (FS/LS) host modes, and the port handlers 645 and 665 are dedicated to device modes. The restriction of functionality may for instance be that the respective transfer buffer units 615, 635, 655 and 675 are tailored to the minimum size necessary for the respective port mode, and the respective low level protocol machines 620, 640, 660, 680 are configured to only handle tokens needed for the respective mode.

Further, the device 600 of FIG. 6 has a port router 685 which may be implemented as crossbar switch for assigning each physical port to the respective port handler. It is noted that the present embodiment allows one port handler unit 605, 625, 645, 665 to operate more than one physical port.

It is found that the device of FIG. 6, when having only one full/low speed mode port handler 625 and only one of the device mode port handlers 645, 665, is probably smaller in size than the device 500 of FIG. 5. Generally, as long as the number of physical ports is greater than the number of port handlers, the implementation of FIG. 6 can be assumed to be of smaller size than the arrangement of FIG. 5.

Both FIGS. 5 and 6 omit the physical devices, as these—be they external or internal—are not part of the controller core in the present embodiment. However, dependent on the respective port speed, the individual physical device determines the interface clocking to the controller. This is the reason why there is not only one common core clock domain in the present embodiment, but individual physical device (phy) clock domains.

In any of the above-described embodiments, a number of useful combinations of ports exist. These combinations may differ in the number of ports and how the support by the controller design is done. The following table lists sample configurations and their appearance to the end-user for up to three ports that are pluggable at the final product, e.g., a PDA (Personal Digital Assistant). The limitation of three is exemplarily chosen because it may be considered sufficient to discuss all substantially different configurations. It is assumed that one port has an A/B receptacle, as defined by the OTG specification, while the other port(s) provide additional connectivity. It should be emphasized that cases where more than one port provides host functionality may also cover the valid configuration that the user has plugged in a mixture of full/low speed (USB 1.1 compliant traffic) and high-speed (USB 2.0 compliant traffic) devices.

costs. It may for instance not be necessary to have PDAs with three ports, hence spare the mechanical elements and space.

In the column, "A/B" denotes the native OTG receptacle which allows hosts as well as devices to be plugged in (A and B devices). It should be noted that on this port the controller's role may change dynamically between host and device by using the HNP protocol mentioned above. "A" denotes a receptacle where only devices can plug into and "B" denotes a receptacle where only hosts can plug into. "B" may also be an attached cable with a B-plug.

In the above table, "Plugging" means the configuration the user plugs together. "H" denotes that the chip acts as host, while "D" denotes that the chip acts as device. The plugging may also change dynamically.

The column "Application" gives just some examples of what use the respective configuration may be.

In any of the embodiments discussed above, the controllers keep the different traffic speeds separate. One approach to achieve this is to translate incoming high-speed traffic from

| Design | Assembly/Bond-out | Plugging | Application (examples) |
| --- | --- | --- | --- |
| HD1 | A/B | H | The SoC controls an attached device. |
|  |  | D | The SoC is controlled by another host. |
| HD1, HDn | A/B, A | H, H | SoC exercises normal host functionality, two (different) devices plugged in, |
| HDn | A/B, B |  | e.g. control the print-out of an image from a (non-OTG) camera to a (non-OTG) printer. |
|  |  | D, H | SoC is remotely controlled and has a device attached to it: sync with PC/another PDA while printing a document |
|  |  | D, D | Two hosts are accessing the SoC: sync between two PCs using shared memory provided by the SoC a built-in printer controller allowing two hosts to connect (i.e. the SoC is the printer controller) |
| HD1, HDn | A/B, A, A | H, H, H | SoC exercises normal host functionality, three (different) devices plugged in. |
| HDn | A/B, A, B | D, H, H | SoC is remotely controlled and has two devices attached to it: sync with PC/another PDA while printing a document a USB repeater? |
|  |  | D, H, D | Two hosts are accessing the SoC while the SoC controls an attached device: a multi-host adaptor for shared resources (e.g. printers), the application running on SoC arbitrates the access |

In the table, "Design" denotes the functionality that needs to be implemented at design-time, e.g., the RTL (Registered Transfer Level) code. "HD1" means to provide functionality for concurrent host and single-device usage. "HDn" means to provide functionality for concurrent host and multi-device usage.

In the column "Assembly/Bond-out", a functionality is indicated that is propagated from the design to the platform by means of either not bonding out all ports that the die provides, or not using all ports that are available as pins on the package. Both ways to limit the number of user-available ports may be useful to control overall system costs.

Using different bond versions of the die may allow to tailor SoC (System on Chip) chips to different segments while not giving up the advantage of volume production. For instance, one could have a die with two USB ports and two Ethernet ports, but offer two packages: one with two USB and one Ethernet port and another package with one USB and two Ethernet ports. When using this approach, tie-bonds may be used to make the hardware resources visible to software consistent with the ports on the package.

Restricting the port number by not using all pins with respective PCB (Printed Circuit Board) wiring may be used by application platform designers to control overall system the upstream (towards host) port into full/low speed traffic down to the downstream (towards device) port by some kind of transaction translator. For a combined host, this would mean to extend the low-level packet handler with a buffer of sufficient size and the appropriate control logic. The buffer may be filled and/or emptied by pseudo split transactions, since no actual high-speed traffic is connected to them as the pseudo transaction translator sits in the host itself. An advantage of this approach is to use already available (or only slightly extended) infrastructure to fetch and decode the respective descriptors as well as for data DMA. The same may be true for the software: the available software may be used to control a full/low speed device plugged into the host as it would be when plugged into a high-speed hub somewhere downstream.

A bandwidth vs. area optimization may be made with this approach. It is possible to use either one pseudo transaction translator for all ports with full/low speed devices or assign each such port its own transaction translator.

Discussing now the device core, each device (each of which can have 31 end points, for example) the SoC supports will connect to a different USB segment. That is, an SoC device in the present embodiment does not share a USB segment with the host, nor would it with another internal device (although this is not mandatory). Hence, the DMA streams issued by a device controller are asynchronous to those of all other ports. As an advantageous consequence, a device virtually does not cause any overhead traffic to system memory (as a host with its descriptor accesses). So, a common port for device and host controller may be on the USB port, determined either at design or plug time. Both controllers could have their individual connection to the system bus. Alternatively (as depicted in FIGS. 5 and 6), an internal arbitration for system bus and memory action for host and device may be used. This may lead to a simpler top-level design without penalty since the data traffic from system to memory for hosts and devices is asynchronous anyway and the point of competition for this resource is just moved into the controller device.

An additional synergy can be obtained by interweaving the device functionality even closer into the host core. As was described above, the combined host controller may need some internal buffer 560, 615, 635, 655, 675 for the pseudo transaction translator. This buffer could be well used in device mode as DMA buffer, as described above. Further, low level packet handling can be shared such as assembly/disassembly and CRC.

Also, since three distinct port modes are supported (high-speed host, full/low speed host, device) combining all into one common port core will save some space for applications with less than three ports (because then at least one mode specific controller was unused). On the other hand, it may add flexibility for the platform design as each port available on the SoC could support each port mode (which provides for a broader application range for the same chip).

Regardless of which of the above-discussed device structures are used, particularly those depicted in FIGS. 5 and 6, there are several ways to minimize power consumption. The unification and combination of host and device controller functionality in itself minimizes the overall design size and hence power consumption in comparison to a bundle of individual controllers. Further, a coarse-grain power management can be implemented and executed under software control, e.g., by switching off unused ports and their respective control logic and/or status registers. In addition, a hardware based fine-grain power control can be implemented that uses techniques such as optimized state encoding, automated clock gating depending on the controller's states, etc. It is further noted that the choice of the clock domains allows the operation of the majority of the design at the respectively lowest frequency (the port speed determines the phy clock domains).

Making now some bandwidth considerations, it may be assumed that all ports in high speed host mode, i.e., all ports to which high speed devices are plugged into, share the same logical USB segment and hence the same data stream, i.e., DMA channel. It is further assumed that each port in full/low speed host mode, i.e., each port to which a full speed or low speed device is plugged into, resides within its own logical USB segment. Further, it is assumed that all ports in host mode, regardless of speed, belong to the same controller software interface so that software handles high-speed and full/low speed traffic within the same scheduling structures, i.e., descriptors. Moreover, each port in the device mode, i.e., each port to which an external host is connected, may be assumed to reside within its own logical USB segment, regardless of speed.

Under these assumptions, the overall average bandwidth to system memory is then given by:

$$bandwidth = HT + n \cdot FLT + HO + m \cdot DT$$

where HT denotes the high-speed host data traffic, FLT denotes the full/low speed host data traffic, HO denotes the host overhead and DT denotes the device data traffic. These quantities may be estimated as follows: HT=30 MB/s (e.g., camera plus hard disk), FLT: 1.0 MB/s, HO=1.0 MB/s (descriptor read, status update, moderate NAK rate, i.e. non-acknowledgement rate) and DT=8 MB/s (1 high speed isochronous end point).

The sustained peak bandwidth may then be calculated to be about 60 MB/s during the transfer of one high-speed packet of 1 kB (kBytes) maximum on each individual USB segment. Alternatively, the global system bus peak bandwidth may be restricted on the expense of bigger local buffers (1 kB per port in the extreme).

Another issue is system memory latency in connection with maximum burst length. If maximum burst length is less than 1 kB, then multiple accesses are needed to transport a USB packet to/from the system memory. The latency incurred for that may determine the internal buffer size. Alternatively, a system bus that allows for multiple outstanding requests can be used.

To give an example, if the maximum burst length is 64 bytes and the latency is 2 µs a buffer size of about 0.5 kB may be necessary, assuming 1 kB transfer on the USB in about 16 µs and an overall latency of 1 k/64*2 µs=32 µs, so that the buffer holds an equivalent of 8 memory accesses. In contrast, when multiple outstanding requests are supported on the system bus, the buffer size can be limited to approximately one burst length of 64 bytes, assuming that the actual transfer of this data takes much less than 1 µs. This is because the USB may need about 1 µs to transfer this many data and it may therefore be sufficient to issue a memory request every 1 µs. Consequently, at each given time there may be two memory requests in flight.

In any of the above-discussed embodiments, the comparators required by the OTG specification for SRP may be not included in a physical device design but may be separate (pad-)cells.

Given the above-described embodiments, the software interface may also be different from that of conventional controllers. This is because all functionality is combined into one controller which might be reflected by one common memory map. Further, for the SoC, legacy functionality can be dropped, e.g., there may be no need for PCI configuration registers or keyboard emulation. The embodiments may further overcome drawbacks of previous interfaces, for instance by preventing hardware/software race conditions, as they can appear for the EHCI. Moreover, the scheduling of data structures may be optimized for efficiency and small memory footprint. Register files and data structures may be adapted to SoC system bus constraints, for instance with respect to the cache-line boundaries. Moreover, the usage of system resources (for instance, interrupt sources and frequency) may be balanced.

There may be further reasons for changes in the software interface: for instance, the interface could be ported to other architectures which may bring out changes in address width. These other architectures may provide for more flexible sizing of the memory pages. This may allow the reduction in number of physical page pointers in the descriptors and thus the overhead bandwidth.

Based on this, the embodiments may use a new software interface, which may further lead to some new low-level driver software to be developed as well.

As mentioned above, architectures having physical pages greater than the usual 4 kB may be advantageously employed to save system memory and bandwidth on the system bus. The descriptor sizes used for the host interface may be determined by the nature and data payloads of their respective traffic.

For USB 2.0 isochronous traffic, a high-bandwidth device may move up to 3 kB per USB microframe (125 μs). Software must then be able to distinguish between data moved in each of these microframes. In order to minimize the necessity for software updates on scheduling structures, it may be useful to collect a traffic description for eight consecutive microframes, i.e., one frame of 1 ms into one descriptor, which may have the additional advantage of covering the same time as it used to do for USB 1.1 traffic. Consequently, an EHC descriptor for isochronous traffic may consist of 8 lengths/offsets and pointers to 7 physical pages, to provide the necessary 24 kB with arbitrary offset within a 28 kB window. Using a physical page size of 16 kB as provided by the MIPS architecture would allow the reduction in the size of that descriptor by 5dwords (doublewords), thus minimizing the overhead traffic to about 30% since now two page pointers provide a 32 kB window to place the maximum of 24 kB traffic into.

The picture may be similar for bulk and control traffic. The EHC descriptor may use 5 page pointers to provide for a space of 16 kB, placed into a 20 kB window. The actual sizes may be somewhat arbitrary and may be chosen to balance the software update rate with the descriptor size. It is noted that the overhead bandwidth may almost exclusively be determined by the fact that for each USB transfer, one such descriptor is read and updated, not by the fact that after maximum 20 kB, a new descriptor has to be read.

In fact, this may influence the rate at which a descriptor cache needs to be updated. However, due to the decision to keep bulk and control traffic in the same scheduling queue for the EHC, a cache is by far not as useful as it could be, since it has to be flushed at a considerable rate, in order not to miss newly linked control descriptors. In contrast, the OHC software interface may be much better in this respect, since it may not only keep bulk and control scheduling lists separate but also provide for a way for software to notify the controller that it has added new descriptors, thus relieving the controller from walking lists of inactive descriptors.

In an embodiment, a bulk descriptor may be restricted to one physical page of 16 kB length. Either software may be able to guarantee a start offset of zero or the update rate for these new descriptors is slightly higher. However, this may be more than made up for by the minimization of at least 25% (a reduction of three dwords, the dword width the fourth page pointer carries other information that may not fit in the rest of the descriptor).

Referring to the numerous embodiments described above, a design of an integrated OTG dual-role controller may be implemented almost from scratch, reusing only sub modules of existing blocks. This may advantageously allow for integrated, tailored, legacy-free solutions for embedded SoC applications. Another advantage may be that there may be a single system bus interface. Further, the chip size, power consumption, and system resources such as bus accesses or interrupts may be reduced. In addition, the embodiments may provide the best match to the (internal) physical devices as well as the best match to low-level driver software.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A controller device comprising:
   a first port connectable to a first serial bus;
   a first port handler unit coupled to the first port and configured to control transfer of data on the first serial bus provide functionality specified by the USB (Universal Serial Bus) OTG (On The Go) supplement according to a serial bus protocol and
   a second port connectable to a second serial bus; and
   a second port handler unit coupled to the second port and configured to control transfer of data on the second serial bus provide functionality specified by the USB OTG supplement according to the serial bus protocol wherein each one of said first and second port handler units is configured to selectively operate in a host mode and a device mode support host and device functionality at the respective first or second port; and
   wherein the controller device is configured such that, when each of the first and second port handlers are operating in the host mode, one of the first and second port handler units operates as a master while the other one of the port handler units operates as a slave, wherein the master is configured to generate data packets, and wherein the slave is configured to copy data packets generated by the master;
   wherein each of said first and second port handler units comprise:
   a low level protocol module configured to handle packet assembly and/or disassembly;
   a transfer buffer module configured to buffer incoming or outgoing data to average out system memory latencies; and
   a memory access module configured to generate memory requests in compliance with said USB host and/or device functionality.

2. The controller device of claim 1, wherein said first port handler unit and said second port handler unit are of substantially the same hardware structure.

3. The controller device of claim 1, wherein said low level protocol module is further configured to perform CRC (Cyclic Redundancy Check) generation and/or checking.

4. The controller device of claim 1, wherein said transfer buffer module is a FIFO (First In First Out) transfer buffer module.

5. The controller device of claim 1, wherein said transfer buffer module is further configured to perform clock translation between the core clock domain and the physical device clock domain.

6. The controller device of claim 1, wherein said memory access module is a DMA (Direct Memory Access) memory access module.

7. The controller device of claim 1, wherein said memory access module is further configured to enforce system bus limits.

8. The controller device of claim 1, wherein the controller device is configured to control data traffic at a predefined number of physical ports, and comprising a predefined number of port handler units including said first and second port handler units, said predefined number of physical ports being the same as said predefined number of port handler units.

9. The controller device of claim 8, wherein said predefined number of physical ports and said predefined number of port handler units are three.

10. An integrated circuit chip having circuitry configured to control data transfer to and/or from at least one peripheral device selectively having device or host functionality and being connected to a serial bus, said circuitry comprising:
- a first port handler circuit configured to control data transfer to and/or from a peripheral device connected to a first port of said integrated circuit chip; and
- a second port handler circuit configured to control data transfer to and/or from a peripheral device connected to a second port of said integrated circuit chip,
- wherein each one of said first and second port handler circuits is configured to selectively operate in a host mode and a device mode; and
- wherein the integrated circuit is configured such that, when each of the first and second port handlers are operating in the host mode, one of the first and second port handler units operates as a master while the other one of the port handler units operates as a slave, wherein the master is configured to generate data packets, and wherein the slave is configured to copy data packets generated by the master;
- wherein each of said first and second port handler units comprise:
  - a low level protocol module configured to handle packet assembly and/or disassembly;
  - a transfer buffer module configured to buffer incoming or outgoing data to average out system memory latencies; and
  - a memory access module configured to generate memory requests in compliance with said USB host and/or device functionality.

11. A controller device comprising:
a first port connectable to a first serial bus;
a first port handler unit coupled to the first port and configured to control transfer of data on the first serial bus according to a serial bus protocol when a first device is connected to the first port via the first serial bus;
a second port connectable to a second serial bus;
a second port handler unit coupled to the second port and configured to control transfer of data on the second serial bus according to the serial bus protocol when a second device is connected to the second port via the second serial bus;
a third port connectable to a third serial bus; and
a third port handler unit coupled to the third port and configured to control transfer of data on the third serial bus according to the serial bus protocol when a third device is connected to the third port via the third serial bus;
wherein said first port handler unit, said second port handler unit, and said third port handler unit are of substantially the same hardware structure, and wherein each of said first, second, and third port handler traits is configured to selectively operate in a host mode and a device mode, and
wherein one of said first and third port handler units is configured to operate as master while the other one of said first and third port handler units is configured to operate as slave when both said first and third port handler units are operating in the host mode, wherein the master is configured to generate data packets and the slave is configured to copy the data packets generated by the master;
wherein each of said first, second, and third port handler units comprise:
a low level protocol module configured to handle packet assembly and/or disassembly;
a transfer buffer module configured to buffer incoming or outgoing data to average out system memory latencies; and
a memory access module configured to generate memory requests in compliance with said serial bus protocol.

12. The controller device of claim 11, wherein said low level protocol module is further configured to perform CRC (Cyclic Redundancy Check) generation and/or checking.

13. The controller device of claim 11, wherein said transfer buffer module is a FIFO (First In First Out) transfer buffer module.

14. The controller device of claim 11, wherein said transfer buffer module is further configured to perform clock translation between the core clock domain and the physical device clock domain.

15. The controller device of claim 11, wherein the buffer size of the transfer buffer module of said first port handler unit is different from the buffer size of the transfer buffer module of said second port handler unit.

16. The controller device of claim 11, wherein said memory access module is a DMA (Direct Memory Access) memory access module.

17. The controller device of claim 11, wherein said memory access module is further configured to enforce system bus limits.

18. The controller device of claim 11, configured to control data traffic at a predefined number of physical ports, and comprising a predefined number of port handler units including said first, second, and third port handler units, said predefined number of physical ports being the same as said predefined number of port handler units.

19. The controller device of claim 18, wherein said predefined number of physical ports and said predefined number of port handler units are three.

20. The controller device of claim 18, wherein said predefined number of port handler units greater than three.

21. The controller device of claim 11, wherein each of said first and third port handler units comprise a transfer buffer module configured to buffer incoming or outgoing data to average out system memory latencies,
wherein the buffer size of the transfer buffer module of said first port handler unit is different from the buffer size of the transfer buffer module of said third port handler unit.

22. The controller device of claim 11, further comprising:
a port router configured to assign said first and second ports to said first and second port handler units, respectively.

23. The controller device of claim 11, further comprising:
a bus arbitration unit configured to arbitrate bus master accesses from said first port handler unit but not from said second port handler unit to the system bus.

24. The controller device of claim 11, further comprising:
a bus arbitration unit configured to arbitrate bus master accesses from said first port handler unit and said second port handler unit to the system bus.

25. A dual-role controller device comprising:
a first port handler unit, a second port handler unit, and a third port handler unit each configured to control data transfer on a first, second, and third serial bus, respectively, according to a serial bus protocol at a respectively coupled port to which a device is connectable, wherein each of said first second, and third port handler units includes:
a low level protocol module configured to handle packet assembly and/or disassembly;

a transfer buffer module configured to buffer incoming or outgoing data to average out system memory latencies; and a memory access module configured to generate memory requests in compliance with said serial bus protocol;

wherein at least two of said first, second, and third port handler units is configured to selectively operate in a host mode and a device mode; and wherein the dual-role controller device is configured such that when a plurality of said first, second, and third port handler units is operating in the host mode, one of the plurality of port handler units operates as a master while other ones of the plurality of port handler units each operate as a slave, wherein the master is configured to generate data packets and each slave is configured to copy the data packets generated by the master.

26. The controller device of claim 25, wherein said low level protocol module is further configured to perform CRC (Cyclic Redundancy Check) generation and/or checking.

27. The controller device of claim 25, wherein said transfer buffer module is a FIFO (First In First Out) transfer buffer module.

28. The controller device of claim 25, wherein said transfer buffer module is further configured to perform clock translation between the core clock domain and the physical device clock domain.

29. The controller device of claim 25, wherein the buffer size of the transfer buffer module of said first port handler unit is different from the buffer size of the transfer buffer module of said second port handler unit.

30. The controller device of claim 25, wherein said memory access module is a DMA (Direct Memory Access) memory access module.

31. The controller device of claim 25, wherein said memory access module is further configured to enforce system bus limits.

32. The controller device of claim 25, configured to control data traffic at a predefined number of physical ports, and comprising a predefined number of port handler units, said predefined number of physical ports being the same as said predefined number of port handler units.

33. The controller device of claim 32, wherein said predefined number of physical ports and said predefined number of port handler units are three.

34. The controller device of claim 33 wherein said predefined number of port handler units greater than three.

35. The controller device of claim 25, wherein each of said first, second, and third port handler units comprise a transfer buffer module configured to buffer incoming or outgoing data to average out system memory latencies, wherein the buffer size of the transfer buffer module of said first port handler unit is different from the buffer size of the transfer buffer module of said second port handler unit.

36. The controller device of claim 25, further comprising: a port router configured to assign at least one physical port to one of said first, second, or third port handler units.

37. The controller device of claim 25, further comprising: a bus arbitration unit configured to arbitrate bus master accesses from said at least one port handler unit to the system bus.

38. An apparatus comprising:

first means for controlling data transfer in accordance with a serial bus protocol to and/or from a first peripheral device connected to a first port via a first serial bus and for selectively operating in a host mode and a device mode, said first means being coupled to said first port; and second means for controlling data transfer in accordance with the serial bus protocol to and/or from a second peripheral device connected to a second port via a second serial bus and for selectively operating in the host mode and the device mode, said second means being coupled to said second port;

wherein, when both said first means and said second means are operating in the host mode, one of said first means and said second means operates as a master and the other one of said first means and said second means operates as a slave, wherein said master generates data packets and said slave copies said data packets;

wherein each of said first means and said second means includes:

third means for performing packet assembly and disassembly;

fourth means for buffering incoming and outgoing data to average out system latencies; and fifth means for generating memory requests in compliance with the serial bus protocol.

39. The apparatus as recited in claim 38, further comprising:

sixth means for arbitrating accesses to a system bus by said first means and said second means;

seventh means for storing descriptors; and eighth means for fetching descriptors from said seventh means and providing said descriptors to said sixth means.

40. The controller device of claim 1, wherein each of the first and second port handlers are configured to, when operating in the host mode, to initiate transactions to a device coupled to its respective serial bus.

41. The controller device of claim 40, wherein each of the first and second port handlers are configured to, when operating in the device mode, to operate as a peripheral device, wherein, when operating as a peripheral device, each of the first and second port handlers is configured to respond to a request received from a corresponding device operating as a host, via its respective serial bus.

42. The controller device of claim 41, wherein the host mode is a high speed host mode, and wherein each of the first and second port handlers are further configured to operate in a full/low speed host mode, wherein data transfer speed in the full/low speed host mode is less than that of the high speed host mode.

* * * * *

UNITED STATES PATENT AND TRADEMARK OFFICE
CERTIFICATE OF CORRECTION

PATENT NO. : 7,506,077 B2  
APPLICATION NO. : 11/158512  
DATED : March 17, 2009  
INVENTOR(S) : Kay Hesse It is certified that error appears in the above-identified patent and that said Letters Patent is hereby corrected as shown below:

Claim 1, col. 12, lines 8-21, please change from:
    a first port handler unit coupled to the first port and configured to control transfer of data on the first serial bus provide functionality specified by the USB (Universal Serial Bus) OTG (On-The-Go) supplement according to a serial bus protocol and
    a second port connectable to a second serial bus; and
    a second port handler unit coupled to the second port and configured to control transfer of data on the second serial bus provide functionality specified by the USB OTG supplement according to the serial bus protocol wherein each one of said first and second port handler units is configured to selectively operate in a host mode and a device mode support host and device functionality at the respective first or second port; and to:
    a first port handler unit coupled to the first port and configured to control transfer of data on the first serial bus according to a serial bus protocol;
    a second port connectable to a second serial bus; and
    a second port handler unit coupled to the second port and configured to control transfer of data on the second serial bus according to the serial bus protocol;
    wherein each one of said first and second port handler units is configured to selectively operate in a host mode and a device mode; and Claim 11, col. 13, line 53, please change "traits" to "units".

Signed and Sealed this

Second Day of June, 2009

JOHN DOLL  
*Acting Director of the United States Patent and Trademark Office*